(12) United States Patent
Fahlbusch et al.

(10) Patent No.: US 8,611,029 B2
(45) Date of Patent: Dec. 17, 2013

(54) OBJECTIVE LENS ASSEMBLY

(75) Inventors: Ingo Fahlbusch, Goettingen (DE);
Georg Herbst, Goettingen (DE); Dieter Boening, Ebergoetzen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 13/534,767

(22) Filed: Jun. 27, 2012

(65) Prior Publication Data

US 2013/0003200 A1   Jan. 3, 2013

(30) Foreign Application Priority Data

Jun. 29, 2011  (DE) .......... 10 2011 078 302

(51) Int. Cl.
*G02B 7/02* (2006.01)
*G02B 15/14* (2006.01)

(52) U.S. Cl.
USPC ............... 359/823; 359/822; 359/694

(58) Field of Classification Search
USPC ............... 359/694–704, 811–830
See application file for complete search history.

(56) References Cited

U.S. PATENT DOCUMENTS

| | | | |
|---|---|---|---|
| 3,441,339 A | 4/1969 | Rederer et al. | |
| 5,515,210 A | 5/1996 | Devenyi | |
| 2001/0009480 A1 | 7/2001 | Engelhardt | |
| 2004/0085629 A1 | 5/2004 | Zimmermann et al. | |
| 2005/0046972 A1* | 3/2005 | Soppelsa | 359/813 |
| 2009/0265884 A1* | 10/2009 | Losberger | 16/2.1 |
| 2009/0316281 A1 | 12/2009 | Reichmann et al. | |
| 2011/0036698 A1* | 2/2011 | Wahrenberg | 200/345 |

FOREIGN PATENT DOCUMENTS

| | | |
|---|---|---|
| DE | 1 547 276 | 12/1969 |
| DE | 287 581 A5 | 2/1991 |
| DE | 101 01 711 A1 | 8/2001 |
| DE | 102 51 379 A1 | 5/2004 |
| DE | 103 39 255 A1 | 3/2005 |
| DE | 10 2008 029 161 B3 | 10/2009 |
| DE | 10 2009 048 316 A1 | 4/2011 |
| JP | 62247311 A | 10/1987 |
| JP | 07104163 A | 4/1995 |
| JP | 2003202478 A | 7/2003 |
| JP | 2007286173 A | 11/2007 |
| JP | 2009-122571 A | 6/2009 |
| JP | 2010-256599 A | 11/2010 |

* cited by examiner

*Primary Examiner* — Mohammed Hasan
(74) *Attorney, Agent, or Firm* — Patterson Thuente Pedersen, P.A.

(57) ABSTRACT

An objective lens assembly is provided, with a sleeve, a first positioning member arranged in the sleeve, which is housed displaceable in longitudinal direction of the sleeve and holds at least one lens, a first adjustment unit which brings the first positioning member into abutment on the inside of the sleeve such that the first positioning member rests against the inside of the sleeve in a first linear contact area and at the same time the displaceability of the first positioning member is maintained. More than one positioning member can be utilized along with multiple lenses and can utilize simple mechanical structures (e.g., blind- and through-holes and pins or shanks) and/or magnetic or magnetizable materials to maintain a desired position of the sleeve.

19 Claims, 5 Drawing Sheets

OBJECTIVE LENS ASSEMBLY

CROSS REFERENCE TO RELATED APPLICATION

This application claims the full benefit of and priority to German National Patent Application DE 10 2011 078302.4 filed 29 Jun. 2011 and captioned, "Objective" the contents of which are incorporated herein in their entirety.

FIELD OF THE INVENTION

The present invention relates to an objective lens assembly for an instrument such as a microscope or a telescope.

BACKGROUND OF THE INVENTION

As the optical requirements applied to objective lenses increase, the mechanical tolerances required during the manufacture of such objectives also increase. This increasingly leads to difficulties.

Thus for example, in the case of objectives with a correction function, a sleeve is often provided which can be formed as a hollow cylinder, in which a first positioning member is housed displaceable in longitudinal direction of the sleeve, wherein the first positioning member holds at least one lens. In order to ensure displaceability, in the case for example of a positioning member with a diameter of 20 mm and a height of 15 mm, an average base clearance of 0.004 mm is provided between the positioning member and the sleeve. As the positioning member is often connected to a drive-side pin and is entrained by same in order to be moved, the positioning member can tilt in the sleeve, which results in an undesired lateral offset of the at least one lens of the positioning member. Tilting can also occur if the objective is rotated in order to be moved from an inverse into an upright operating position.

SUMMARY OF THE INVENTION

Starting from this basis, an object of the disclosure is to provide an objective with which a tilting of a positioning member and/or a lateral offset of at least one lens of the objective lens assembly can be prevented or reduced.

According to the disclosure, the foregoing object is achieved by an objective with a sleeve, a first positioning member arranged in the sleeve, which is housed displaceable in longitudinal direction of the sleeve and holds at least one lens, and a first adjustment unit which brings the first positioning member into abutment on the inside of the sleeve such that the first positioning member rests against the inside of the sleeve in a first linear contact area and at the same time the displaceability of the first positioning member is maintained.

Any undesirable tilting of the positioning member with the sleeve is thereby reliably prevented and at the same time a defined abutment is provided, with the result that when the sleeve is suitably positioned an undesired lateral offset can be prevented.

Optionally, a second positioning member can be arranged in the sleeve of the objective lens assembly, housed displaceable in longitudinal direction of the sleeve and holding at least one lens, wherein a second adjustment unit is provided which brings the second positioning member into abutment on the inside of the sleeve such that the second positioning member rests against the inside of the sleeve in a second linear contact area and at the same time the displaceability of the second positioning member is maintained.

Thus in the case of an objective with several positioning members, every positioning member can be reliably prevented from undesirable tilting.

In particular, the first and/or the second positioning member can hold one or more lenses. If for example the positioning member has only one lens, the mount of the lens can itself form the positioning member.

The two contact areas of the objective can lie on a common first bearing line. Thus all lenses of the positioning members are positioned on the same bearing line, which markedly reduces the relative offset of the lenses of the individual positioning members relative to one another.

The second adjustment unit can affect the abutment of the second positioning member on the inside of the sleeve by means of magnetic forces. For this, permanent magnets for example can be provided. It is also possible that the sleeve and/or the second positioning member contains a magnetizable material.

Furthermore, the second adjustment unit can affect the abutment of the second positioning member on the inside of the sleeve by means of a biasing, or spring force. A separate biasing member or spring structure can be provided for this effect. It is also possible that in the second adjustment unit at least one blind hole is formed, the base surface of which is permanently deformed in the direction of the inside of the sleeve in order to affect the desired biasing or spring force for the abutment on the inside of the sleeve.

In particular, at least one of the contact areas can extend parallel to the longitudinal direction of the sleeve.

The first positioning member of the objective can have a third adjustment unit which brings the at least one lens of the first positioning member into abutment on the first positioning member in a linear contact area. If the first positioning member holds at least two lenses, the adjustment unit can also bring all the lenses into abutment on the first positioning member, each in a linear contact area, wherein the linear contact areas of the lenses of the first positioning member lie on a common second bearing line.

Thus, each linear contact area of the lenses of the first positioning member lies opposite the first linear contact area.

The third adjustment unit of the objective can affect the abutment of the lens or the lenses on the first positioning member by means of the biasing or spring force.

For this, for example the third adjustment unit can have a blind hole in the first positioning member, wherein the base of the blind hole is permanently deformed in the direction of the lens in order to provide the biasing or spring force for the abutment of the lens. The base of the contact hole thus presses against the lens or its mount, with the result that the desired abutment is reached.

Thus, two blind holes are each provided with permanently deformed bases, with the result that the linear contact area is defined by means of the positions of the blind holes.

Sleeve and adjustment unit(s) can be formed as hollow cylinders (in particular circular cylinders), if desired.

Furthermore, in addition or alternatively the third adjustment unit in the first positioning member can have a through bore in lieu of a blind bore or hole, with the result that the lenses can be pressed through the through bore against the inside of the first positioning member and the positioning can be fixed in the through bore by means of adhesive or the like.

The first adjustment unit in the objective can affect the abutment of the first positioning member on the inside of the sleeve by means of magnetic forces. In particular, permanent magnets or switchable electromagnets can be provided for this. It is also possible that the first positioning member and/or the sleeve contain magnetizable material.

Furthermore, as noted previously the first adjustment unit can affect the abutment of the first positioning member on the inside of the sleeve by means of a biasing member or spring force.

The first and second adjustment units can be developed in the same way as the third adjustment unit.

Furthermore, the objective can have a setting unit with which the first and/or second positioning member is displaced in longitudinal direction of the sleeve.

Further embodiments are herein provided having an objective with a sleeve, at least two lenses arranged in the sleeve, and a first adjustment unit which brings the at least two lenses into abutment on the inside of the sleeve such that each lens rests against the inside of the sleeve in a linear first contact area and all linear first contact areas lie on a common bearing line.

The first adjustment unit can affect the abutment of at least one of the lenses on the inside of the sleeve by means of magnetic forces. Furthermore, the first adjustment unit can affect the abutment of at least one lens on the inside of the sleeve by means of the biasing member or spring force. Thus the first adjustment unit can have for example a blind hole in the sleeve, wherein the base of the blind hole is permanently deformed in the direction of the lens in order to provide the spring force for the abutment of the lens.

Furthermore, the first adjustment unit can also have a through bore in the sleeve, with the result that the lens can be brought through the through bore into abutment on the inside of the sleeve and this positioning can be fixed by means of adhesive for example.

Further provided is an objective with a sleeve, two positioning members arranged in the sleeve each of which is housed displaceable in longitudinal direction of the sleeve and each of which holds at least one lens, and an adjustment unit connected to both positioning members, which moves at least one of the positioning members in the sleeve into a tilted state and keeps it there, wherein in the tilted state the positioning member rests in the area of its upper end against a first side of the sleeve and in the area of its lower end against a second side, lying opposite the first side, of the sleeve. Thus a defined degree of tilting is reached, with the result that uncontrolled tilting can be prevented.

The lenses in the objective according to the invention can (but need not) sit or be disposed in discrete mounting structures.

It is understood that the features mentioned above and those yet to be explained below can be used, not only in the stated combinations, but also in other combinations or alone, without departing from the scope of the present disclosure.

The disclosure is explained in further detail below by way of example with reference to the attached drawings which also disclose features essential and optional to the embodiments herein described.

DETAILED DESCRIPTION OF THE ILLUSTRATED EMBODIMENTS

Figure 1:
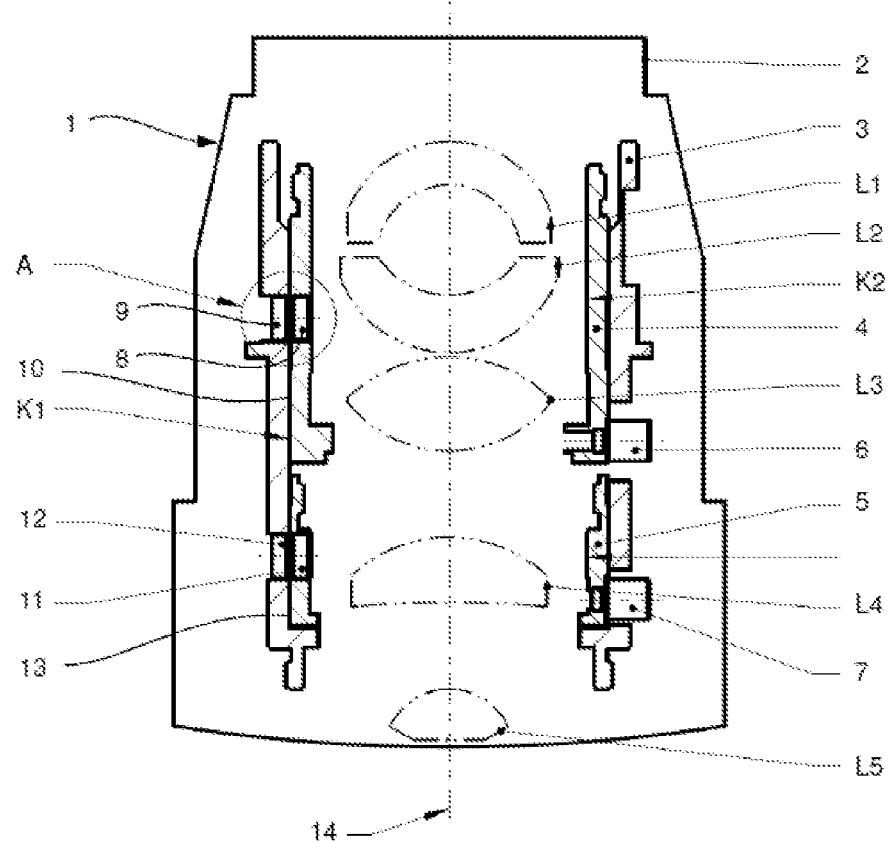
FIG. 1 is a schematic view of a first embodiment of the objective 1 according to the present disclosure.

In the embodiment shown in FIG. 1, the objective assembly 1 according to the instant disclosure comprises an objective housing 2 in which a sleeve 3 shaped as a hollow cylinder is arranged. To simplify the representation, the coupling of the sleeve 3 to the objective housing 2 is not drawn in.

In the sleeve 3, a first and a second positioning member 4, 5, the outsides of which are each formed as cylinders, are arranged displaceable in longitudinal direction of the sleeve 3. For this, each positioning member 4, 5 has a pin 6, 7 which forms the drive-side end of the respective positioning member 4, 5 and which is connected to a positioning element which is not shown in order to simplify the representation. The positioning element can, for example, realize a mechanical coupling with an adjusting ring (not shown) arranged on the outside of the objective housing 2, with the result that when the adjusting ring is rotated an axial movement of the corresponding positioning member 4, 5 (thus a movement along the longitudinal direction of the sleeve 3) is affected. Naturally, the positioning element can for example also be formed as an actuator.

Three lenses L1, L2 and L3 are arranged in the first positioning member 4. A lens L4 is arranged in the second positioning member 5. The lenses L1-L4 are displaceable in axial direction by means of the positioning members 4, 5. Furthermore, another lens L5 is arranged in the objective housing 5 at its lower end which lens L5 can be called fixed lens L5, as it is not housed displaceable in axial direction. However, the lens L5 and/or at least one of the lenses L1-L4 of the positioning members 4, 5 can (but need not) be displaceable transverse to the longitudinal direction of the sleeve 3 in order to thereby make possible an optical correction of the objective.

To simplify the representation, the lens mounts of the lenses L1-L5 are not drawn in. In the case of the lenses L1-L4, there is a maximum clearance of 0.003 mm between the lens mounts and the respective positioning members 4, 5.

In order for the positioning members 4, 5 to be displaceable in the sleeve 3, the clearance between positioning member 4, 5 and sleeve is 0.004 mm.

Figure 2:
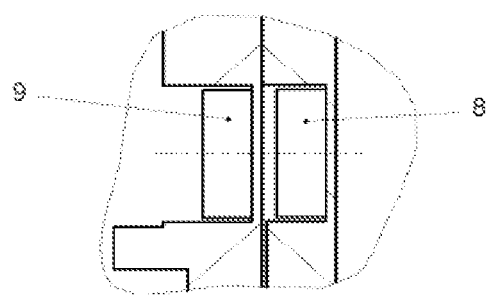
FIG. 2 is an enlarged view of detail A from FIG. 1.

As can further be seen from FIG. 1 and the enlarged view of detail A from FIG. 1 as illustrated in FIG. 2, the first positioning member 4 has a first magnet 8 and the sleeve 3 has a second magnet 9 lying opposite. These are permanent magnets which are oriented such that they attract each other, or alternatively they can comprise electromagnets that are switchable controlled via a remote source of electrical current. As a result, the first positioning member 4 (seen in FIG. 1) is pulled or biased (i.e., to the left as depicted) and rests against the inside of the sleeve 3 in a linear contact area 10.

A tilting of the first positioning member 4 about the first pin 6 due to the clearance, provided for the displaceability of the first positioning member 4, between the first positioning member 4 and sleeve 3 is thereby prevented, as the first positioning member 4 rests as described against the inside of the sleeve 3 as a result of the magnetic coupling between the two magnets 8, 9.

The arrangement shown in FIG. 1 of the magnets 8, 9 vis-à-vis the pin 6 is advantageous because when the pin 6 is installed in the first positioning member 4 a force or pressure is exerted on the pin 6 and the first positioning member 4 is thus moved towards the second magnet 9. Thus it is not necessary for the first positioning member 4 to be first drawn towards the sleeve 3 via the force of attraction of the magnets 8, 9 over the whole linear contact area 10. Thus, it can for example be ensured that the clamping of the pin 6 in the positioning element (not shown) does not result in its not coming to rest, despite the magnetic coupling.

The two magnets 8, 9 are designed as magnetic disks with an axially emerging magnetic field (in horizontal direction in FIG. 1), as a result of which the two magnets 8, 9 can align the first positioning member 4 perpendicular to the magnetic disks.

Thus not only is the tilting of the first positioning member 4 prevented, but the first positioning member 4 is drawn against the linear contact area 10 on the inside of the sleeve 3 and is thereby conveniently positioned on a still more precise axis than could be achieved by the combination of first positioning member 4 and sleeve 3 despite very narrow base clearances.

The same applies to the second positioning member 5 which, like the first positioning member 4, has a first magnet 11 which cooperates with a second magnet 12 arranged in the sleeve 3 and thereby causes the second positioning member 5 to come to rest against the inside of the sleeve 3 in a linear contact area 13. The two linear contact areas 10 and 13 lie on a common first bearing line K1.

As an alternative to the permanent magnets 8, 9, 11 and 12, at least one of the magnets 8, 9, 11, 12 can be replaced by a magnetizable or magnetized material contained in the positioning member 4, 5 or the sleeve 3.

Because of the given clearance of 0.004 mm between the sleeve 3 and the respective positioning member 4, 5, the positioning members 4, 5 come to rest on average 0.002 mm off the theoretical optical axis 14.

In order to compensate for this parallel offset relative to the theoretical optical axis 14, the mounts of the lenses L1-L4 can be mounted in the respective positioning member 4, 5 as is described below for the first positioning member 4 in connection with FIGS. 3-5.

Figure 3:
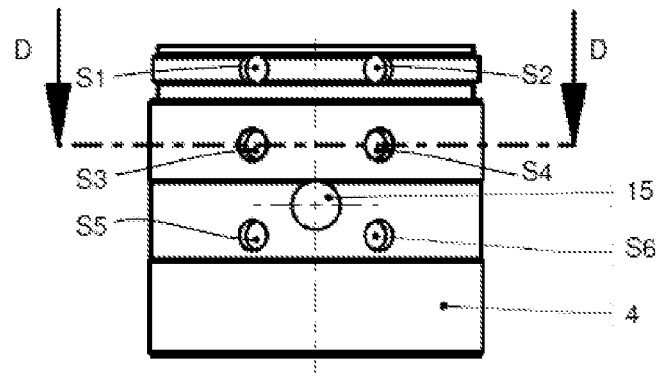
FIG. 3 is an enlarged view of the first positioning member 4.

As is shown in FIG. 3, the first positioning member 4 has, in addition to a bore 15 for the first magnet 8, three pairs each of two blind holes S1-S6 which are open to the outside. Each pair of blind holes S1-S6 has two blind holes S1, S2, S3, S4 and S5, S6, which are each arranged offset in peripheral direction relative to the bore 15. The two blind holes S1-S6 of each pair are each arranged such that the bore 15 lies in the center relative to the peripheral direction.

Figure 4:
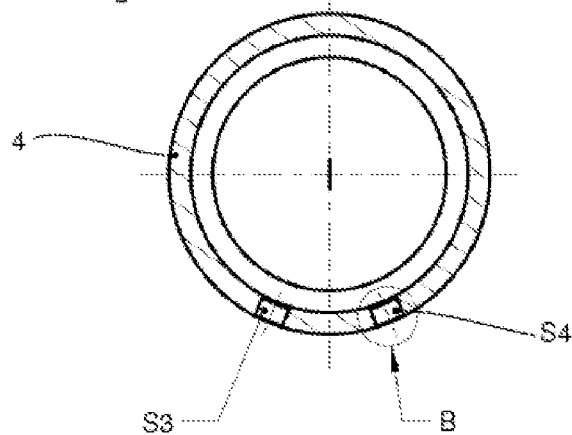
FIG. 4 is a sectional view along the section line D-D from FIG. 3.
Figure 5A:
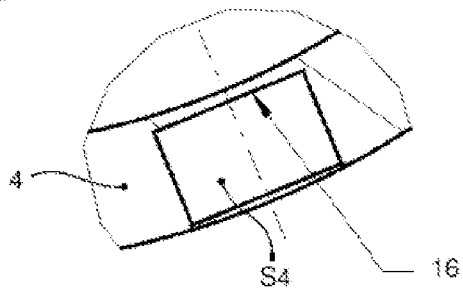
FIGS. 5A and 5B are enlarged views of detail B from FIG. 4.
Figure 5B:
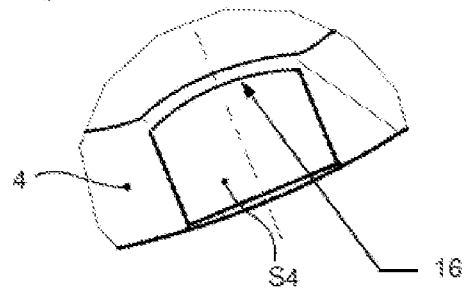

The section along line D-D for the blind holes S3 and S4 is shown in FIG. 4. The blind hole S4 is shown enlarged in FIGS. 5A and 5B, wherein in FIG. 5A the state of the blind hole after realization of the bore is shown. As a result of forming the blind hole, a biasing structure or "spring bar" 16 remains which forms the base of the blind hole S4. This biasing structure or spring bar 16 is then permanently deformed inwards, resulting in the state illustrated in FIG. 5B. The deformation is chosen such that the spring bar 16 keeps the inserted lens L1-L3 with the corresponding mount pressed against the right inside (seen in FIG. 1) of the first positioning member 4. Due to the described arrangement of the blind holes S1-S6 in pairs and their position relative to the bore 15, the mounts of the lenses L1-L3 then each rest in a substantially linear contact area against the inside of the first positioning member 4, wherein the linear contact areas lie on a common second bearing line K2 (depicted in FIG. 6A) which lies opposite the first bearing line K1 (depicted in FIG. 1). In the embodiment example described here, both bearing lines K1 and K2 extend parallel to each other and lie diametrically opposite each other.

As there is an average lateral offset of 0.0015 mm due to the clearance of 0.003 mm between the mounts of the lenses L1-L3 and the first positioning member 4, the lateral offset of 0.002 mm caused by the magnetic coupling is reduced by this average lateral offset of 0.0015 mm due to the spring bars 16 of the blind holes S1-S6, with the result that overall there is a lateral offset of only 0.0005 mm vis-à-vis the theoretical optical axis 14.

Naturally, it can also be said that the offset due to the mounting of the lenses L1-L3 by means of the spring bars 16 is reduced by the offset due to the magnetic coupling of sleeve 3 and positioning member 4.

This will also be described below in connection with FIGS. 6A and 6B in which only the first positioning member 4 together with lenses L1-L3 are drawn in.

Figure 6A:
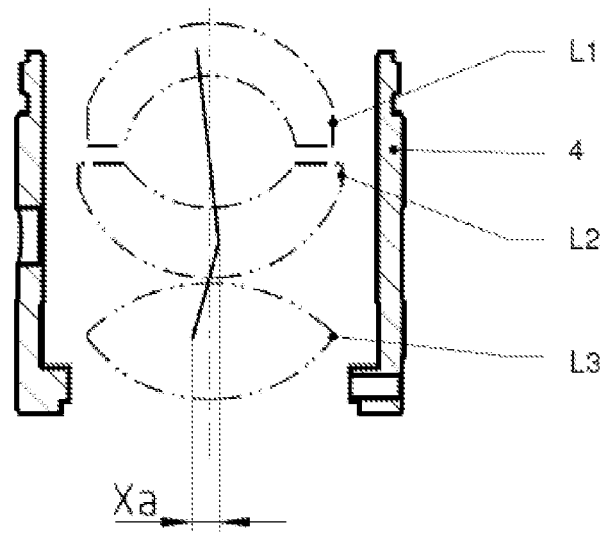
FIGS. 6A and 6B are schematic views of the first positioning member 4 together with the lenses L1-L3 illustrating the lateral offset.

FIG. 6A shows the case where the lenses L1-L3 with their mounts are provided in the first positioning member 4, wherein there are no spring bars 16. Thus a lateral offset Xa is established which varies over the whole tolerance field.

Figure 6B:
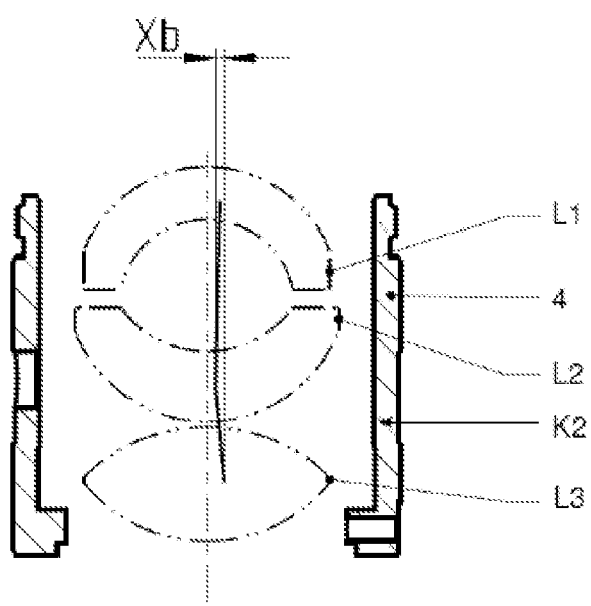

If the mounted lenses L1-L3 are then pressed by means of the spring bars 16 against the second bearing line K2, as shown in FIG. 6B, a resulting lateral offset Xb is achieved which is much smaller than the lateral offset Xa without spring bars 16.

Instead of the blind holes S1-S6 with the spring bars 16, through holes or through bores can also be provided. In this case, after insertion into the positioning member 4, 5, the mounted lenses L1-L5 are pushed against the bearing line 17 and fixed (for example by means of an adhesive).

Furthermore, it is possible to provide a spring-loaded element (not shown), instead of the magnets 8, 9, between the positioning member 4 and the sleeve 3, which can be arranged for example on the side of the pin 6. The spring-loaded element then serves to press or bias +the positioning member 4 in the same way as the magnets 8, 9 press or bias against the bearing line K1.

The biasing or spring-loaded element can for example be realized in the described manner by the formation of blind holes and inwardly directed, permanently deformed spring bars.

The previously described objective 1 according to the instant disclosure contains two positioning members 4, 5. Naturally, the objective 1 according to the disclosure can contain only one positioning member or also more than two positioning members, e.g. three, four, five or even more positioning members. If the objective 1 according to the disclosure contains more than one positioning member, at least one positioning member has a described adjustment unit. It may well happen that at least one further positioning member has no adjustment unit if the tolerances for the lateral offset of the lenses of this positioning member are so large that they can be maintained even without an adjustment unit.

Furthermore, it is possible that the mount of a lens is itself serving as the positioning member. In this case, the positioning member comprises for example only one lens, with the result that no further component need be provided in addition to the lens mount in order to provide the desired positioning member displaceable in longitudinal direction of the sleeve 3.

As a rule, only one adjustment unit between sleeve and positioning member would then be used.

Figure 7:
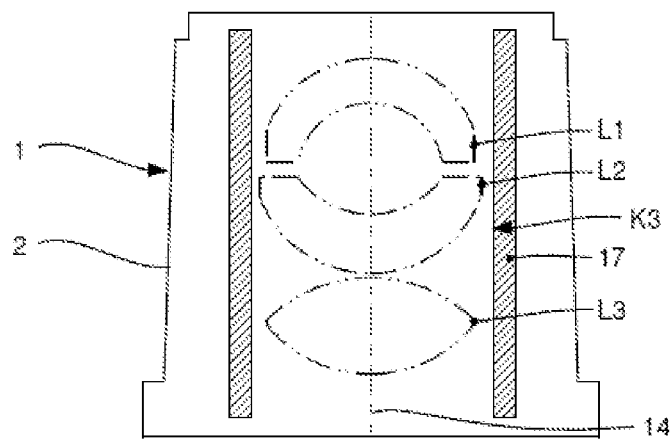
FIG. 7 is a schematic view of a further embodiment of the objective 1 according to the present disclosure.

FIG. 7 shows schematically a further embodiment in which three lenses L1, L2 and L3 are arranged in a sleeve 17 which sits in the objective housing 2 of the objective 1 according to the disclosure. To simplify the representation, the connection of the sleeve 17 to an objective housing 2 is not drawn in. The sleeve 17 is connected to the housing 2 such that is not displaceable.

Furthermore, the mounts of the lenses L1-L3 are again not shown, for simplification purposes.

The sleeve 17 comprises the blind holes described in connection with FIGS. 3 to 5 with the inwardly directed, permanently deformed blind hole bases which form spring bars with which the lenses L1-L3 are pressed against a bearing line K3 on the inside of the sleeve 17.

The bearing line K3 preferably extends parallel to the theoretical optical axis 14.

As all lenses L1-L3 thus rest against the defined bearing line K3, an excellent adjustment can be achieved. In particular, it is possible to arrange the sleeve 17 displaced to the left, seen in FIG. 7, towards housing 2 by the predetermined offset with the result that the most optimum possible adjustment is achieved.

Naturally, for at least one lens L1-L3 no blind holes with spring bars can be provided, but instead the already described through bores, wherein the corresponding lens is then pressed against the bearing line K3 during mounting and this position of the lens fixed by means of for example adhesive.

Figure 8:
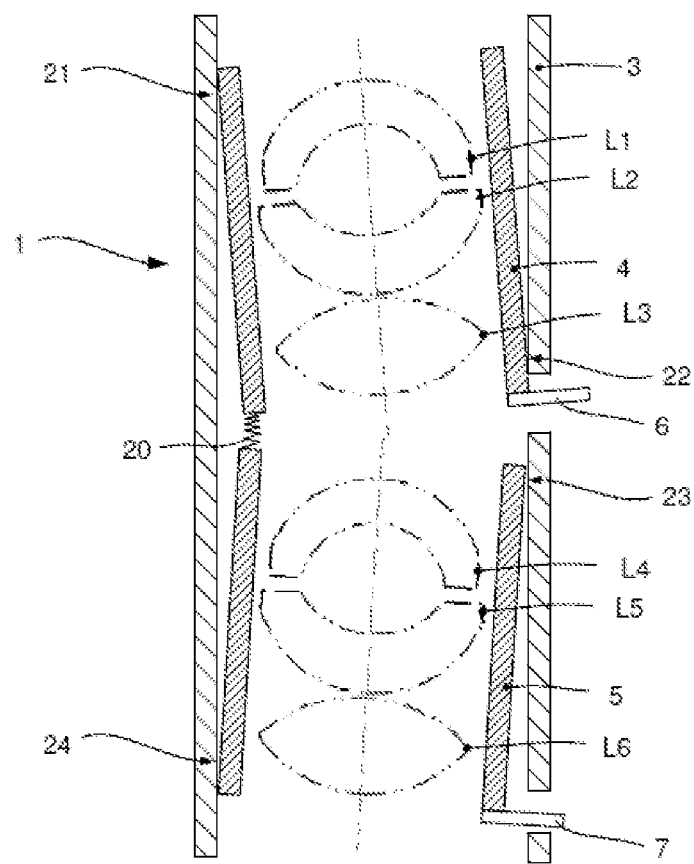
FIG. 8 is a schematic view of a further embodiment of the objective 1 according to the instant disclosure.

FIG. 8 shows schematically a further embodiment in which a spring 20 (here a tension spring which is anchored on both positioning members 4, 5, for example by adhesive) is provided between the two positioning members 4, 5. This spring 20 results in a tilting of for example the first positioning member 4, with the result that the first positioning member 4 rests in an upper area 21 on the left inside the sleeve 3 and in a lower area 22 on the right inside the sleeve 3.

In this case, the first positioning member 4 is tilted. However, it is a defined degree of tilting, with the result that uncontrolled tilting can be prevented.

The second positioning member 5 is tilted in the same way, wherein here the upper area 23 of the second positioning member rests against the sleeve 3 on the right and the lower area 24 rests against the sleeve 3 on the left, as is shown greatly exaggerated in FIG. 8. In both cases, the centre of rotation is in the area of the drive-side pins 6, 7.

The second positioning member 5 is thus also in a predefined degree of tilting.

Both positioning members 4, 5 are still displaceable in an axial direction.

Figure 9:
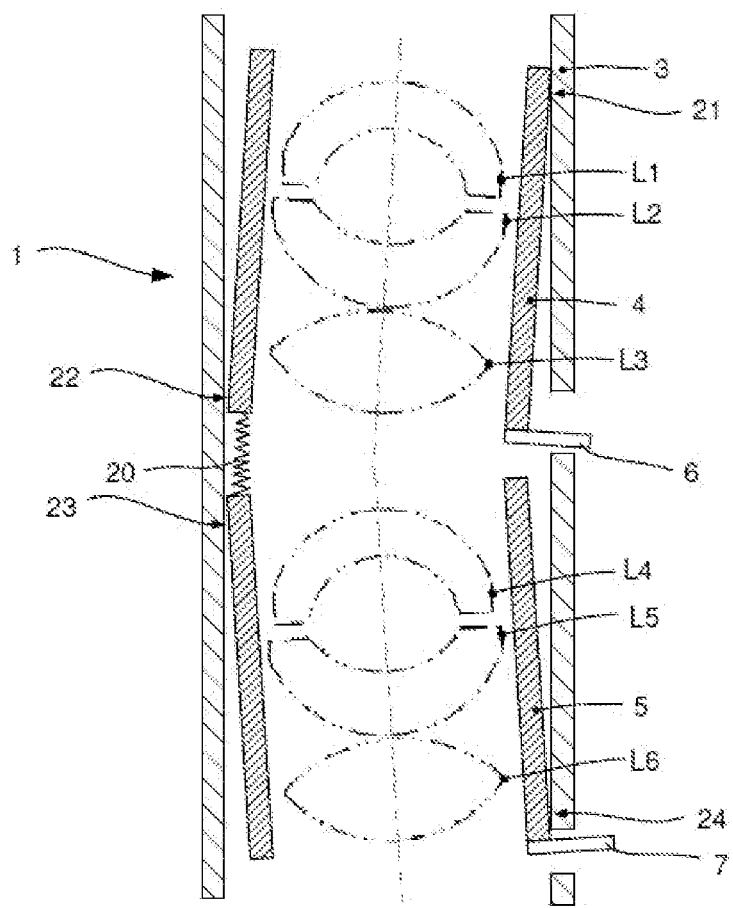
FIG. 9 is a schematic representation of a further embodiment of the objective 1 according to the present disclosure.

A modification of the embodiment according to FIG. 8 is shown in FIG. 9. In this case, the spring 20 is formed as compression spring which projects into blind holes (not shown) of the two positioning members 4, 5, with the result that a separate anchoring is not required. As a result of the blind holes, the compression spring 20 cannot slip. The resultant tilting of the positioning members 4, 5 is then such that the upper end 21 of the first positioning member 4 rests against the inside of the sleeve 3 on the right, while the lower end 22 of the first positioning member 4 rests against the inside of the sleeve 3 on the left. Furthermore, the upper end 23 of the second positioning member 5 likewise rests against the inside of the sleeve 3 on the left and the lower end 24 of the second positioning member 5 rests against the inside of the sleeve 3 on the right. Thus there is also a defined degree of tilting for every positioning member in the embodiment according to FIG. 9.

While the foregoing descriptions and depictions are intended to inform those of skill in the art they are not intended as limiting but rather illustrative as to the metes and bounds of the claimed invention.

The invention claimed is:

1. An objective assembly for an optical instrument, comprising:
   a hollow sleeve member,
   a first positioning member arranged in the hollow sleeve member, the first positioning member being housed displaceably in a longitudinal direction of the hollow sleeve member and holding at least one lens,
   a first adjustment unit which brings the first positioning member into abutment on the inside of the hollow sleeve member such that the first positioning member rests against the inside of the hollow sleeve member in a first linear contact area and wherein at the same time displaceability of the first positioning member is maintained.

2. The objective assembly according to claim 1, in which a second positioning member is arranged in the hollow sleeve member, housed displaceably in longitudinal direction of the hollow sleeve member and holding at least one second lens, and in which a second adjustment unit is provided which brings the second positioning member into abutment on the inside of the hollow sleeve member such that the second positioning member rests against the inside of the hollow sleeve member in a second linear contact area and at the same time the displaceability of the second positioning member is maintained.

3. The objective assembly according to claim 2, in which the first linear contact area and the second linear contact area lie on a common first bearing line.

4. The objective assembly according to claim 2, in which the second adjustment unit affects the abutment of the second positioning member on the inside of the hollow sleeve member by application of magnetic forces.

5. The objective assembly according to claim 2, in which the second adjustment unit affects the abutment of the second positioning member on the inside of the hollow sleeve member by application of spring force.

6. The objective assembly according to claim 1, in which at least one of the first linear contact area and the second linear contact area extends parallel to the longitudinal direction of the hollow sleeve member.

7. The objective assembly according to claim 1, in which the first positioning member has a third adjustment unit which brings the at least one first lens of the first positioning member into abutment on the first positioning member in a third linear contact area.

8. The objective assembly according to claim 7, in which the first positioning member holds at least two lenses which are all brought by application of the third adjustment unit into abutment on the first positioning member in each case in a linear contact area, wherein the first linear contact area and the third linear contact area of the lenses of the first positioning member lie on a common second bearing line.

9. The objective assembly according to claim 8, in which each linear contact area of the lenses of the first positioning member lies opposite the first linear contact area of the first positioning member.

10. The objective assembly according to claim 7, in which each of the third linear contact area of the lenses of the first positioning member lies opposite the first linear contact area of the first positioning member.

11. The objective assembly according to claim 7, in which the third adjustment unit affects the abutment of the lens or the lenses on the first positioning member by application of spring force.

12. The objective assembly according to claim 11, in which the third adjustment unit has a blind hole in the first positioning member, wherein the base of the blind hole is permanently deformed in the direction of the lens in order to provide the spring force for the abutment of the lens.

13. The objective assembly according to claim 1, in which the first adjustment unit affects the abutment of the first positioning member on the inside of the hollow sleeve member by application of magnetic forces.

14. The objective assembly according to claim 1, in which the first adjustment unit affects the abutment of the first positioning member on the inside of the hollow sleeve member by application of spring force.

15. An objective assembly for an optical instrument, comprising; a hollow sleeve member, at least two lenses arranged in the hollow sleeve member, and a first adjustment unit which brings the lenses into abutment on the inside of the hollow sleeve member such that each lens rests against the inside of the hollow sleeve member in a linear first contact area and all linear first contact areas lie on a common bearing line; and in which the first adjustment unit affects the abutment of at least one of the lenses on the inside of the hollow sleeve member by means of magnetic forces.

16. An objective assembly for an optical instrument, comprising: a hollow sleeve member, at least two lenses arranged in the hollow sleeve member, and a first adjustment unit which brings the lenses into abutment on the inside of the hollow sleeve member such that each lens rests against the inside of the hollow sleeve member in a linear first contact area and all linear first contact areas lie on a common bearing line; and in which the first adjustment unit affects the abutment of at least one of the lenses on the inside of the hollow sleeve member by means of spring force.

17. The objective assembly according to claim 16, in which the first adjustment unit has a blind hole in the hollow sleeve member, wherein the base of the blind hole is permanently deformed in the direction of the lens in order to provide the spring force for the abutment of the lens.

18. An objective assembly for an optical instrument, comprising:
  a hollow sleeve member;
  two positioning members arranged in the hollow sleeve member, which are each housed displaceably in longitudinal direction of the hollow sleeve member and each of which holds at least one lens; and
  an adjustment unit connected to both positioning members, which moves at least one of the positioning members in the hollow sleeve member into a tilted state and keeps the at least one positioning member there, wherein in the tilted state the at least one positioning member rests in the area of an upper end thereof against a first side of the hollow sleeve member and in the area of a lower end thereof against a second side of the hollow sleeve member, lying opposite the first side, of the hollow sleeve member.

19. The objective assembly according to claim 18, wherein the adjustment unit includes one of: a magnetic material, a magnetizable material, a blind hole, and a through hole.

* * * * *

UNITED STATES PATENT AND TRADEMARK OFFICE
CERTIFICATE OF CORRECTION

PATENT NO. : 8,611,029 B2  Page 1 of 1
APPLICATION NO. : 13/534767
DATED : December 17, 2013
INVENTOR(S) : Ingo Fahlbusch et al.

It is certified that error appears in the above-identified patent and that said Letters Patent is hereby corrected as shown below:

In the Specification

Col. 6, line 43, delete "+"

Signed and Sealed this
Twenty-second Day of July, 2014

Michelle K. Lee
*Deputy Director of the United States Patent and Trademark Office*